June 9, 1942. J. J. FLICKINGER 2,285,652
CLUTCH
Filed Oct. 24, 1941 2 Sheets-Sheet 1

Inventor
John Jacob Flickinger
By Clarence A. O'Brien
Attorney

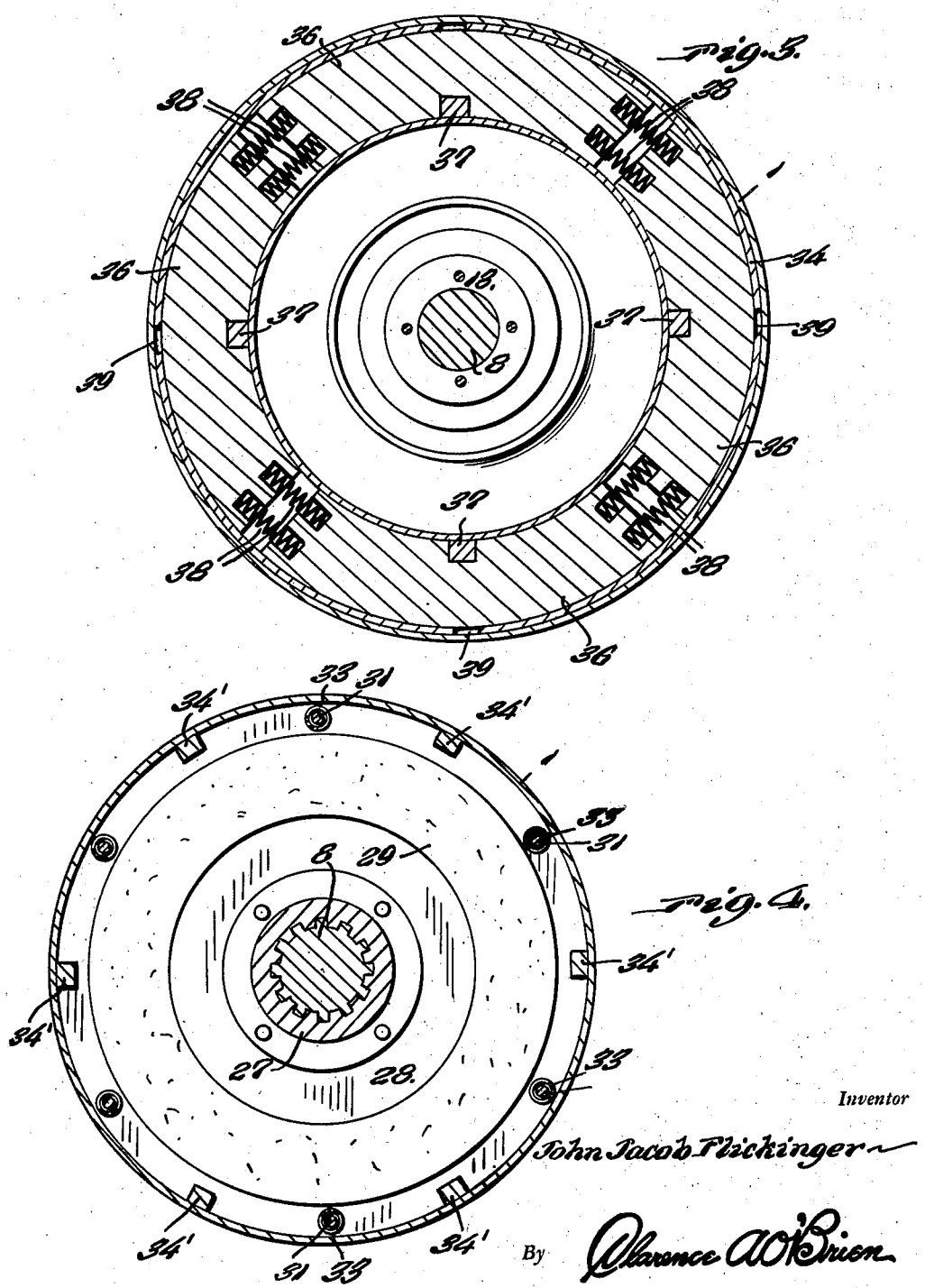

Patented June 9, 1942

2,285,652

UNITED STATES PATENT OFFICE 2,285,652

CLUTCH

John Jacob Flickinger, Massillon, Ohio, assignor of one-tenth to Raymond O. Morgan, Orrville, Ohio Application October 24, 1941, Serial No. 416,401

1 Claim. (Cl. 192—85)

This invention relates to clutches of a generally similar nature to that constituting the subject matter of my United States Patent No. 2,256,258, issued on September 16, 1941, upon which the present device constitutes an improvement.

The primary object of the present invention is to provide, in a manner as hereinafter set forth, a novel construction and arrangement of coacting clutch elements or members, operable by a fluid, such as mercury, under the influence of centrifugal force, for frictionally connecting a driven member to a driving member for actuation thereby.

Other objects of the invention are to provide a clutch of the aforementioned character which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 3 is a cross-sectional view, taken substantially on the line 3—3 of Figure 1.

Figure 4 is a cross-sectional view, taken substantially on the line 4—4 of Figure 1.

Figure 1:
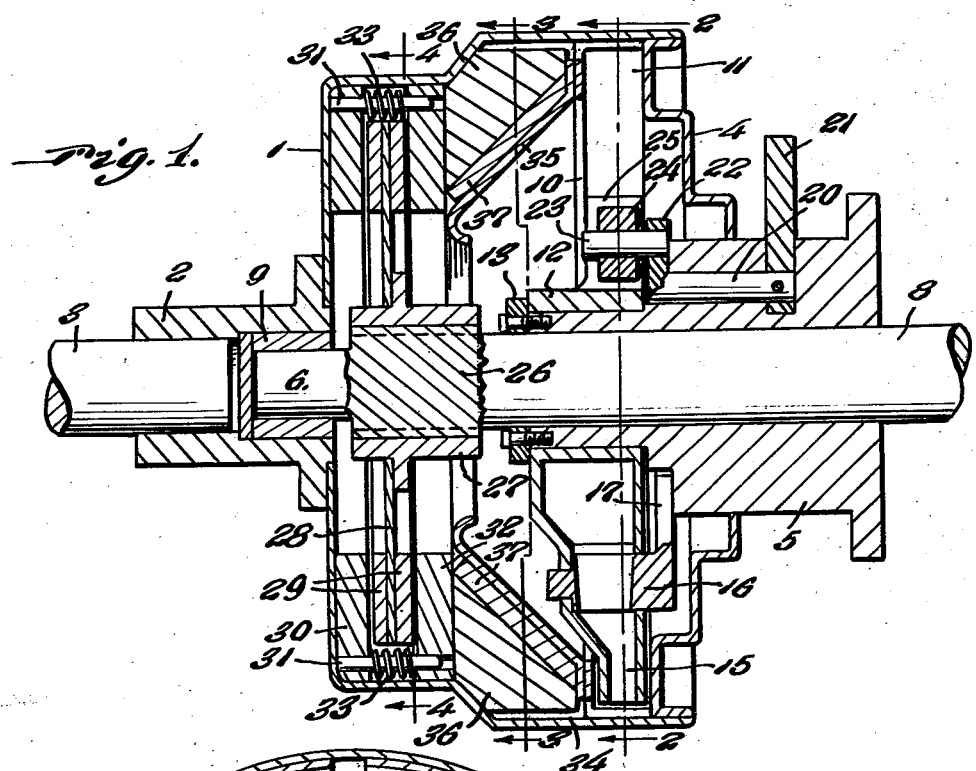
Figure 1 is a view in vertical longitudinal section through a clutch constructed in accordance with the present invention.

Referring now to the drawings in detail, it will be seen that the embodiment of the present invention which has been illustrated comprises a metallic housing 1 which is fixed by a connection 2 to a drive shaft 3. Fixed in the rear end portion of the housing 1 is a back plate 4.

Projecting into the housing 1 through the plate 4 is a stationary sleeve 5. The sleeve 5 comprises a substantially rectangular inner end portion 7 which extends transversely in the housing 1. Extending rotatably through the sleeve 5 into the housing 1 is a driven shaft 8 which terminates in a reduced forward end portion 6. The end portion 6 of the driven shaft 8 is journaled in a bearing 9 which is provided therefor in the connection 2.

Fixed in the rear portion of the housing 1 is a ring 10 of angle iron cross-section which, in conjunction with the plate 4, defines an annular channel 11. The channel 11 is for the reception of mercury (not shown).

Slidable on the portion 7 of the stationary sleeve 5 is a metallic body 12. A retaining plate 13 for the body 12 is secured on the inner end of the stationary sleeve 5. The lower portion of the body 12 is formed to provide a mercury chamber 14. Depending from the chamber 14 is a discharge spout 15 which is controlled by a valve 16. The valve 16 is of the rotary type and comprises an operating arm 17 which is engaged in a notch or recess 18 provided therefor in the lower portion of the stationary sleeve 5 for causing said valve to open and close when the body 12 is shifted on the portion 7 of said sleeve. Also projecting from the body 12 is an intake spout or tube 19 which communicates with the chamber 14 and which constitutes a scoop which is engageable in the channel 11 for removing the mercury therefrom.

Journaled longitudinally in the upper portion of the stationary sleeve is a shaft 20 which is manually operable by suitable means including an arm 21. On the inner end portion of the shaft 20 is an arm 22 having fixed therein a pin 23. Journaled on the pin 23 is a block 24 which is engaged between a pair of upstanding lugs 25 on the body 12. Thus, the body 12 is connected to the arm 21 for actuation thereby on the portion 7 of the stationary sleeve 5.

The shaft 8 comprises an enlarged portion 26 having splined thereon a hub 27. Fixed on the hub 27 is a disk 28. Fixed on the faces of the disk 28 are linings 29.

Mounted in the forward end portion of the housing 1, forwardly of the disk 28, is a stationary clutch ring or member 30. Mounted in the stationary clutch member 30 and projecting rearwardly therefrom is a plurality of pins 31. Slidably mounted on the pins 31 is a clutch member or ring 32. The member 32 is engageable with the disk 28, and, in turn, engages said disk 28 with the ring 30. Coil springs 33 on the pins 31 disengage the clutch ring 32. As illustrated to advantage in Figure 4 of the drawings, keys 34' are fixed at circumferentially spaced points in the forward portion of the housing 1 and are engaged in notches or recesses provided therefor in the peripheries of the clutch members 30 and 32 for positively securing said members to said housing for rotation therewith.

Fixed in the housing 1, between the member or ring 32 and the member 19, is a casing 34. As best seen in Figure 1 of the drawings, the casing 34 is substantially channel-shaped in cross-section and comprises a conical inner portion or flange 35. The casing 34 is for the reception of segmental blocks 36 which ride on the portion 35 of said casing and which are engageable with the clutch member or ring 32 for forcing same forwardly against the tension of the coil springs 33. The blocks 36 may be of wood, aluminum or other suitable material which is considerably lighter in weight than mercury. Guide ribs 37 for the blocks 36 are provided on the inner portion 35 of the casing 34. Coil springs 38 are provided between the ends of the segmental blocks 36 (see Fig. 3) for expanding or opening said blocks when the clutch is to be disengaged.

The peripheral portions of the members 10 and 34 have formed therein a plurality of longitudinally extending passages 39. The passages 39 communicate with the channel 11 for receiving mercury therefrom.

Figure 2:
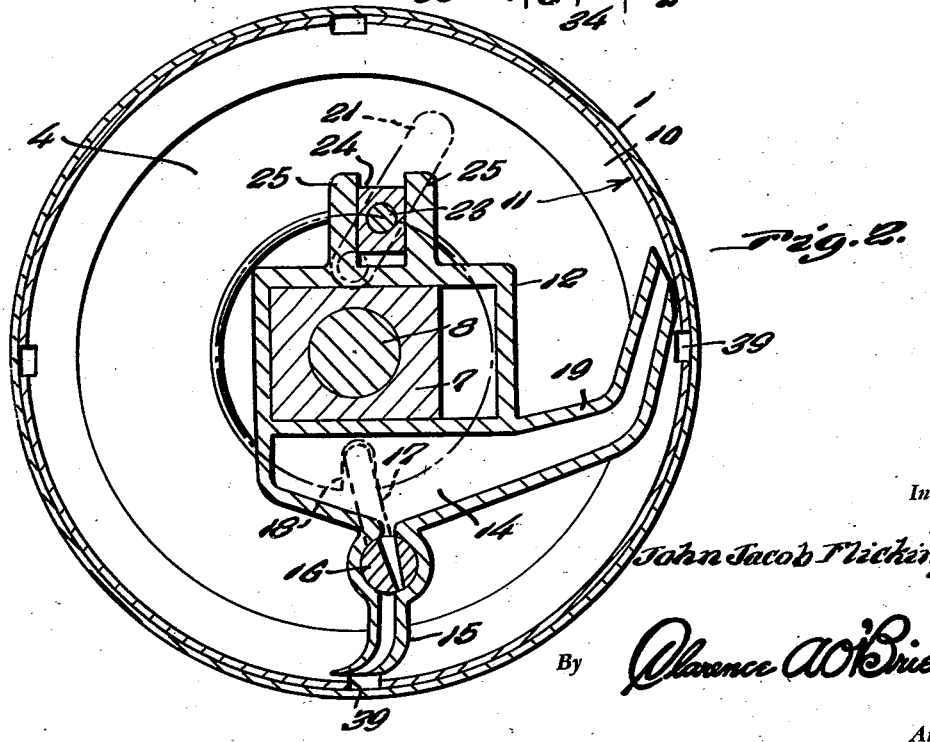
Figure 2 is a cross-sectional view, taken substantially on the line 2—2 of Figure 1.

Briefly, the operation of the device is as follows:

With the clutch elements 28, 30 and 32 disengaged, as seen in Figure 1 of the drawings, the shaft 3, with the housing 1 fixed thereto, is free to rotate relative to the shaft 8. To engage the clutch, the body 12 is shifted from right to left, as viewed in Figure 2 of the drawings, thus withdrawing the chute 19 from the channel 11 and opening the valve 16. The mercury now flows by gravity from the chamber 14 through the discharge spout 15 into the channel 11. Centrifugal force causes this mercury to flow from the channel 11 through the passages 39 into the casing 34 outwardly of the segmental blocks 36. In this manner the comparatively light blocks 36 are forced inwardly and forwardly on the conical inner portion 35 of the casing 34 thus engaging the clutch members 32, 28 and 30 against the tension of the coil springs 33. In this manner the shaft 8 is frictionally connected to the housing 1 for rotation therewith. To disengage the clutch, the body 12 is shifted in the opposite direction on the sleeve 5, thus engaging the chute 19 in the channel 11 and closing the valve 16. Now, as the housing 1 rotates the stationary chute 19 scoops the mercury out of the channel 11 and returns said mercury to the chamber 14. As the mercury in the casing 34 recedes the blocks 36 are expanded by centrifugal force with the assistance of the coil springs 38. The coil springs 33 now disengage the clutch elements 28, 30 and 32 for disconnecting the housing 1 from the shaft 8.

It is believed that the many advantages of a clutch constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

A clutch comprising a driving shaft, a housing fixed on said driving shaft, a driven shaft extending rotatably into the housing and including an enlarged portion, a hub splined on said enlarged portion, a ring fixed in the housing, pins projecting from said ring, a disk fixed on the hub and engageable with the ring, a ring slidable on the pins and engageable with the disk, said disk and the rings constituting means for frictionally connecting the driven shaft to the housing for actuation thereby, springs on the pins for disengaging the second-named ring from the disk, a substantially channel-shaped, annular casing fixed in the housing and including a substantially conical inner portion, a plurality of substantially segmental blocks in the casing operable on said conical portion for engaging the rings and the disk, guides for the blocks on the conical portion of the casing, a fluid in the housing operable by centrifugal force for actuating the blocks for engaging the rings and the disk, and means for controlling said fluid.

JOHN JACOB FLICKINGER.